(12) United States Patent
Meriac et al.

(10) Patent No.: US 10,956,619 B2
(45) Date of Patent: Mar. 23, 2021

(54) DEVICES AND METHOD OF OPERATION THEREOF

(71) Applicant: ARM Limited, Cambridge (GB)

(72) Inventors: Milosch Meriac, Cambridge (GB); Alessandro Angelino, London (GB)

(73) Assignee: ARM LIMITED, Cambridge (GB)

( * ) Notice: Subject to any disclaimer, the term of this patent is extended or adjusted under 35 U.S.C. 154(b) by 404 days.

(21) Appl. No.: 16/060,116

(22) PCT Filed: Dec. 2, 2016

(86) PCT No.: PCT/GB2016/053793
§ 371 (c)(1),
(2) Date: Jun. 7, 2018

(87) PCT Pub. No.: WO2017/098217
PCT Pub. Date: Jun. 15, 2017

(65) Prior Publication Data
US 2018/0365449 A1    Dec. 20, 2018

(30) Foreign Application Priority Data
Dec. 10, 2015    (GB) ..................................... 1521822

(51) Int. Cl.
*H04L 9/00*    (2006.01)
*G06F 21/74*    (2013.01)
(Continued)

(52) U.S. Cl.
CPC ............ *G06F 21/74* (2013.01); *H04L 9/0861* (2013.01); *H04L 9/0894* (2013.01);
(Continued)

(58) Field of Classification Search
CPC ........ G06F 21/74; G06F 21/57; G06F 21/575; H04L 9/0861; H04L 9/0894
See application file for complete search history.

(56) References Cited

U.S. PATENT DOCUMENTS

| | | | | |
|---|---|---|---|---|
| 6,065,125 | A | * | 5/2000 | Shiell .................... G06F 1/3203 713/300 |
| 2003/0037237 | A1 | * | 2/2003 | Abgrall ................. H04L 63/123 713/166 |

(Continued)

OTHER PUBLICATIONS

International Search Report & Written Opinion for PCT/GB2016/053793, dated Mar. 31, 2017, 20 pages.

(Continued)

*Primary Examiner* — Beemnet W Dada
(74) *Attorney, Agent, or Firm* — Patterson Thuente Pedersen, P.A.

(57) ABSTRACT

A device comprising: a processing element; a data store, coupled to the processing element, the data store comprising a non-volatile data store having a trusted region for trusted code and an untrusted region for untrusted code; a security component, coupled to the processing element and the data store, wherein the security component is configured to, in response to one of a power event occurring at the device and receiving a trigger signal, send a first signal to the processing element and the data store, and wherein the processing element is configured to execute trusted code in response to the first signal.

14 Claims, 9 Drawing Sheets

(51) Int. Cl.
*H04L 29/06* (2006.01)
*H04L 9/08* (2006.01)
*G06F 21/57* (2013.01)

(52) U.S. Cl.
CPC .......... *H04L 63/068* (2013.01); *G06F 21/575* (2013.01); *H04L 2463/061* (2013.01)

(56) References Cited

U.S. PATENT DOCUMENTS

| | | |
|---|---|---|
| 2003/0737237 | 2/2003 | Abgrall |
| 2012/0036347 A1* | 2/2012 | Swanson ................. G06F 21/85 713/2 |
| 2013/0166869 A1 | 6/2013 | Wang et al. |

OTHER PUBLICATIONS

Combined Search and Examination Report for GB 1521822.5, dated May 31, 2016, 7 pages.

* cited by examiner

DEVICES AND METHOD OF OPERATION THEREOF

RELATED APPLICATIONS

The present application is a National Phase entry of PCT Application No. PCT/GB2016/053793, filed Dec. 2, 2016, which claims priority from GB Patent Application No. 1521822.5, filed Dec. 10, 2015, said applications being hereby incorporated by reference herein in their entirety.

TECHNICAL FIELD

The present techniques relate to devices. More particularly, the techniques relate to increasing security on data processing devices which may have limited security resources.

More and more devices such as data processing devices are being connected to each other and to computing systems (e.g. servers, web services, registry services), as part of the "Internet of Things" (IoT).

For example, relatively small scale data processing devices such as temperature sensors, healthcare monitors and electronic door locks can be connected to the cloud so that they can be accessed and controlled using remote computer systems. A door lock may be remotely opened by a remote device via an application, or data from one or more temperature sensors may be aggregated at a remote location and accessed from another device, while data from a healthcare monitor may be transmitted from a patient to their doctor's device for real-time diagnosis. Hence, there is an increase in the types of devices being utilized as part of the IoT.

However, due to the embedded nature of such devices, they generally do not comprise the necessary security capabilities required by devices in certain fields, such as in the automotive, military, banking or aerospace sectors.

According to a first technique, there is provided a device comprising:

a processing element; a data store, coupled to the processing element, the data store comprising a non-volatile data store having a trusted region for trusted code and an untrusted region for untrusted code; a security component, coupled to the processing element and the data store, wherein the security component is configured to, in response to one of a power event occurring at the device and receiving a trigger signal, send a first signal to the processing element and the data store, and wherein the processing element is configured to execute one of trusted and untrusted code in response to the first signal.

According to a second technique, there is provided a method of operating a device in a trusted state, the device comprising a processing element coupled to a data store, and wherein a security component is coupled to the processing element and the data store, the method comprising: transmitting, from the security component to the processing element and the data store, a first signal in response to one of a power event at the device and receiving a trigger signal; and executing, at the processing element, one of trusted and untrusted code in response to the first signal.

According to a third technique, there is provided a first device comprising a secure data store, a security component and communication circuitry arranged to communicate with a second device, wherein the first device is configured to transmit a first signal to a processing element on the second device and to the secure data store in response to one of a power event on the second device and receiving a trigger signal from the second device.

According to a further technique there is provided a first device comprising a security component and communication circuitry arranged to communicate with a second device, wherein the first device is configured to transmit a first signal to a processing element thereon and a secure data store on the second device in response to one of a power event on the second device and receiving a trigger signal from the second device.

BRIEF DESCRIPTION OF THE DRAWINGS

Embodiments will now be described with reference to the accompanying figures of which:

FIG. 4b schematically shows example communications between the device and further device of FIG. 4a;

DETAILED DESCRIPTION

Figure 1:
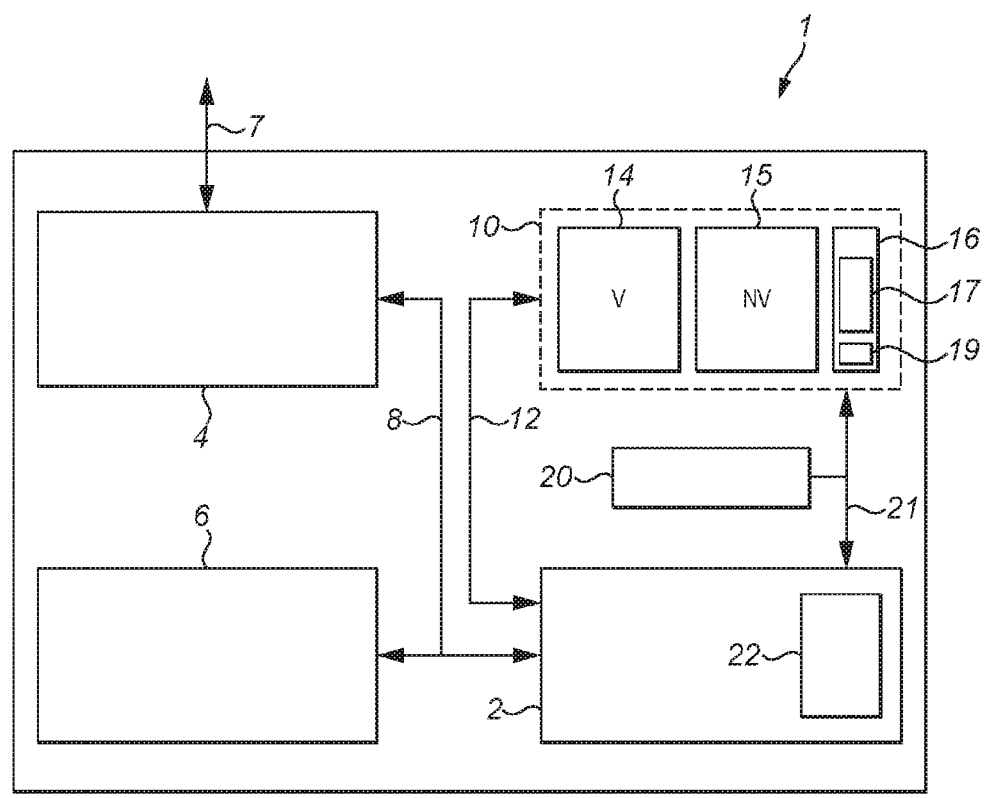
FIG. 1 schematically shows an example of a device, for use with the present techniques.

FIG. 1 schematically shows an example of a device 1 such as a data processing device, for use with the present techniques.

The device, hereinafter "computing device" 1 may comprise any suitable data processing device, and while the computing device 1 in the following embodiments is depicted as being optimised for low-power applications which may be used in various applications such as automotive, banking, military, aerospace applications. Such a computing device may be an embedded sensor device.

However, the techniques may be used by many different computing and electronic devices in a variety of platforms and applications, including conventional computers, servers, portable computers, mobile telephones and the like.

In the present illustrative embodiment, the computing device 1 is depicted as having limited security functionality. For example, the computing device 1 does not have a memory management unit (MMU) or a memory protection unit (MPU). Furthermore, the computing device 1 generally only operates as a single level privilege system, such that there may be little or no control of the access which O/S code or application code has to memory.

The circuitry of the computing device 1 includes processing element 2 coupled to peripheral circuitry such as communication circuitry 4 and input/output (I/O) circuitry 6 via system bus 8.

The processing element 2 is also coupled to storage 10 hereinafter "data store" 10 via memory bus 12. Alternatively, the processing element 2 may be coupled to data store 10 via the system bus 8.

The processing element 2 may comprise processing circuitry (e.g. one or more central processing units (CPU 22)) configured to carry out instructions of code by performing the basic arithmetic, logical, control and input/output (I/O) operations specified by such instructions.

The processing element 2 may also comprise other circuitry and logic, such as a data store (e.g. cache memory) or controllers. In some embodiments the processing element 2 may comprise a microprocessor, which is optimised for low-power, connected applications, such as sensing and/or mobile communications. Such a microprocessor may, for example, be an ARM Cortex M0 microprocessor.

The communication circuitry 4 is provided to communicate with further devices (not shown in FIG. 1) remote from the computing device 1. Such further devices may comprise any suitable data processing device and may include, for example: computer terminals, laptops, mobile devices, embedded devices, servers, gateways, routers, computer platforms, registry services etc.

The communication circuitry 4 may use wireless communication 7, such as, for example, wireless local area network communication (e.g. WiFi), short range communication such as radio frequency identification (RFID) or near field communication (NFC), communications used in wireless sensor networks such as ZigBee, Thread, Bluetooth and/or Bluetooth Low energy (BLE). Also the communication circuitry 4 may use a cellular network such as 3G or 4G. The communication circuitry 4 may also use wired communication (not shown) such as fiber optic or metal cable. The communication circuitry 4 could also use two or more different forms of communication, such as several of the examples given above in combination.

The input/output (I/O) circuitry 6 may comprise sensing circuitry to sense inputs from the surrounding environment and/or to provide an output to a user e.g. using a buzzer or light emitting diode(s) (not shown). The computing device 1 may generate operational data based on the sensed inputs, whereby the operational data may be stored in a volatile memory stored and processed by the processor circuitry 2. The I/O circuitry 6 may also comprise a user interface (e.g. buttons) to allow the user to interact with the computing device 1.

Furthermore, the computing device 1 may comprise a display (not shown) such as an organic light emitting diode (OLED) display, for communicating messages to or receiving inputs from a user via the I/O circuitry 6.

The computing device 1 may also comprise a power source (not shown). The power source may be a battery (e.g. a lithium coin cell), although any suitable power source may be used (e.g. an AC power supply or DC supply), depending on the power requirements of the computing device.

The data store 10 comprises, for example, memory circuitry having a volatile (V) memory store 14 which may, for example, be implemented as dynamic random access memory (DRAM), static RAM (SRAM)) or any suitable implementation of volatile data storage.

The data store 10 further comprises a non-volatile (NV) memory store 15, implemented as read-only memory (ROM), programmable ROM (PROM), one-time programmable non-volatile memory (OTP NVM), electrically erasable programmable ROM (EEPROM), persistent SRAM or any suitable implementation of non-volatile data storage.

While the data store 10 in FIG. 1 is depicted as having a single V and NV memory store, the data store 10 may comprise more than one V and/or NV memory stores as required.

While depicted as being provided as part of the computing device 1 in FIG. 1, the V and/or NV memory stores may be provided as or part of a peripheral device, which is connected to the computing device 1, e.g. via an input port such as a USB port (not shown)

Furthermore the NV memory store 15 may be partitioned to provide a trusted region and an untrusted region, whereby trusted code or data may be stored in the trusted region, while untrusted code or data may be stored in the untrusted region.

Trust may be provided by, for example, ensuring the memory store in which the trusted code is stored cannot be written to/overwritten by an unauthorized party/code.

In some examples such trust may be provided using a hardwired arrangement whereby trusted code is permanently stored in the memory store by, for example, setting fuses or antifuses once code is written to the memory store by a manufacturer or authorized party/code. However, such trust may be additionally or alternatively be provided using a programmable arrangement e.g. by using an EEPROM.

Trusted code may comprise bootloader code, or may comprise other code such as recovery code, safe mode code or other suitable code as will be appreciated by a person skilled in the art.

Upon a power event (e.g. after a hard reset or a soft reset), trusted code is executed by the processing element 2, for example, to transfer other code from the NV memory store 15 to the processing element 2. When the trusted code completes, control is passed to the other code, which may be untrusted code (e.g. the operating system (OS) code), or which may be other trusted code.

It will be appreciated that when executing trusted code, the computing device 1 is considered to be operating in a trusted state and when executing untrusted code, the computing device 1 is considered to be operating in an untrusted state.

The recovery code may comprise code which, when executed, restores the code on the computing device to a particular moment in time, thereby deleting any code written to V or NV memory stores thereon after that moment in time. Such a restore may comprise a factory restore.

The safe mode code may cause the computing device to operate with a different functionality in comparison to say the OS code when executed. For example, the computing device 1 may operate with a limited functionality whereby certain application code is prohibited from executing or certain components/circuitry on the device are prohibited from functioning e.g. the I/O circuitry 6.

Data such as credentials may also be stored in the data store 10. Such credentials may include key data such as cryptographic key data or challenge data for use in cryptographic or verification operations between the computing device 1 and further computing devices remote therefrom.

In some embodiments the data store 10 comprises a further NV memory store in the form of a secure key store 16.

The secure key store 16 may be hard-coded, for example by way of a permanent or programmable arrangement during manufacture of the computing device 1. The secure key store 16 may comprise, for example, an EEPROM, flash memory or a battery backed SRAM or any suitable implementation of non-volatile data storage.

In the present example, the secure key store 16 is depicted as being a discrete component, separate from the NV memory store 15.

Figure 7A:
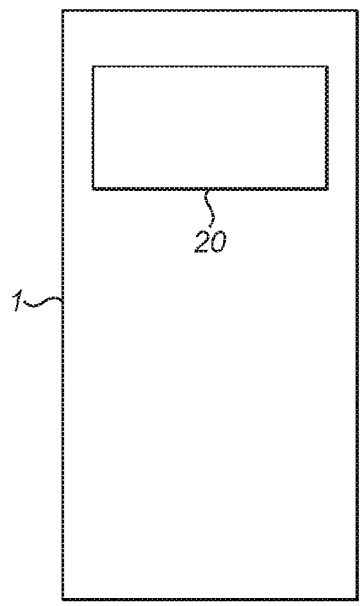
FIG. 7a schematically shows an example implementation of a security component on the device of FIG. 1 according to an embodiment.
Figure 7B:
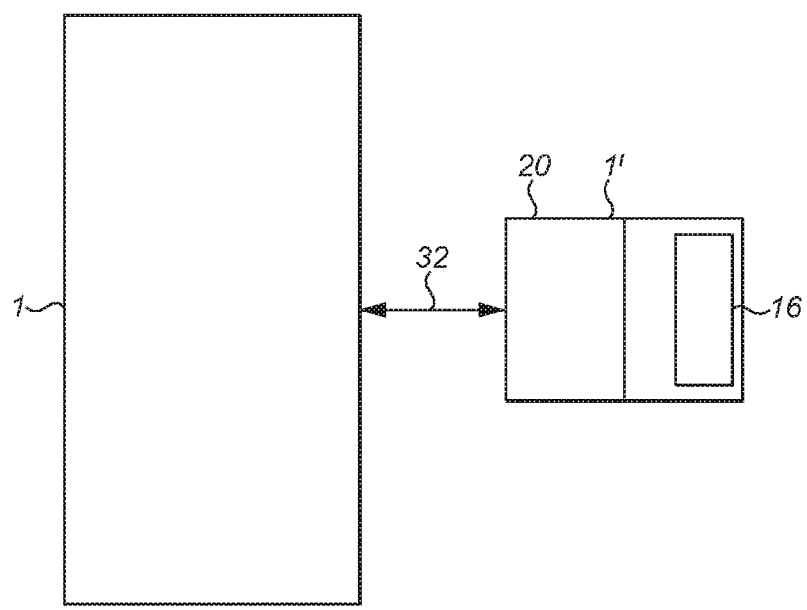
FIG. 7b schematically shows an example implementation of a security component on the device of FIG. 1 according to a further embodiment.
Figure 7C:
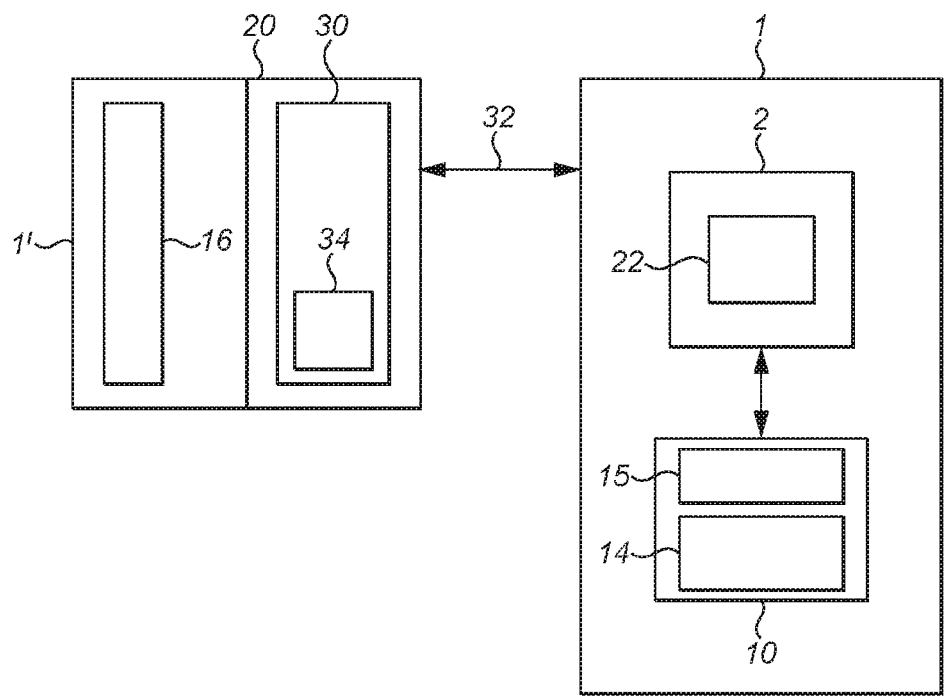
FIG. 7c schematically shows an example implementation of a security device according to an embodiment.

In other embodiments, the secure key store 16 may be part of the NV memory store 15, while in further embodiments the secure key store 16 may be provided on a different device in communication with the computing device 1 (see, for example, FIG. 7c). In such a configuration, although on a different device, the secure key store 16 will be considered to be part of the data store 10 when the different device is in communication with the computing device 1. In some embodiments, the secure key store 16 may be part of a security storage engine or memory storage engine.

In the present embodiment, the secure key store 16 is configured to store key data 17, e.g. one or more cryptographic keys or challenge data, whereby the key data 17 is preferably unique to the computing device 1. The key data 17 is hereinafter referred to as "device key" (Dk).

In the present embodiment, Dk is derived from further key data, hereinafter referred to as "master key" (Mk). For example, Dk may be derived from Mk using even further key data, hereinafter referred to as "device key seed value".

The device key seed value may comprise an identifier associated with the computing device 1. Such an identifier (ID) is preferably unique to the computing device and may comprise a globally unique identification value (GUID) or a universally unique identifier (UUID) associated with the device, and may be stored in ROM on the computing device 1.

Mk is preferably not stored on or is not accessible by the computing device 1 but is stored on or is accessible by a further device remote therefrom with which it is in communication (as described in greater detail below).

While the computing device 1 has limited security functionality as set out above, the computing device 1 comprises a security component 20 arranged in communication with the processing element 2 and data store 10 via a security bus 21.

In alternative embodiments the memory bus 12 or the system bus 8 may be used to provide communication between the processing element 2, the data store 10 and the security component 20.

The security component 20 provides for increased security for the computing device 1 in comparison to when the security component 20 is not present. The form and functionality of the security component 20 is described in greater detail below.

It will be appreciated that the computing device 1 may comprise other hardware/software components not described herein depending on the specific functionality of the computing device 1.

Figure 2:
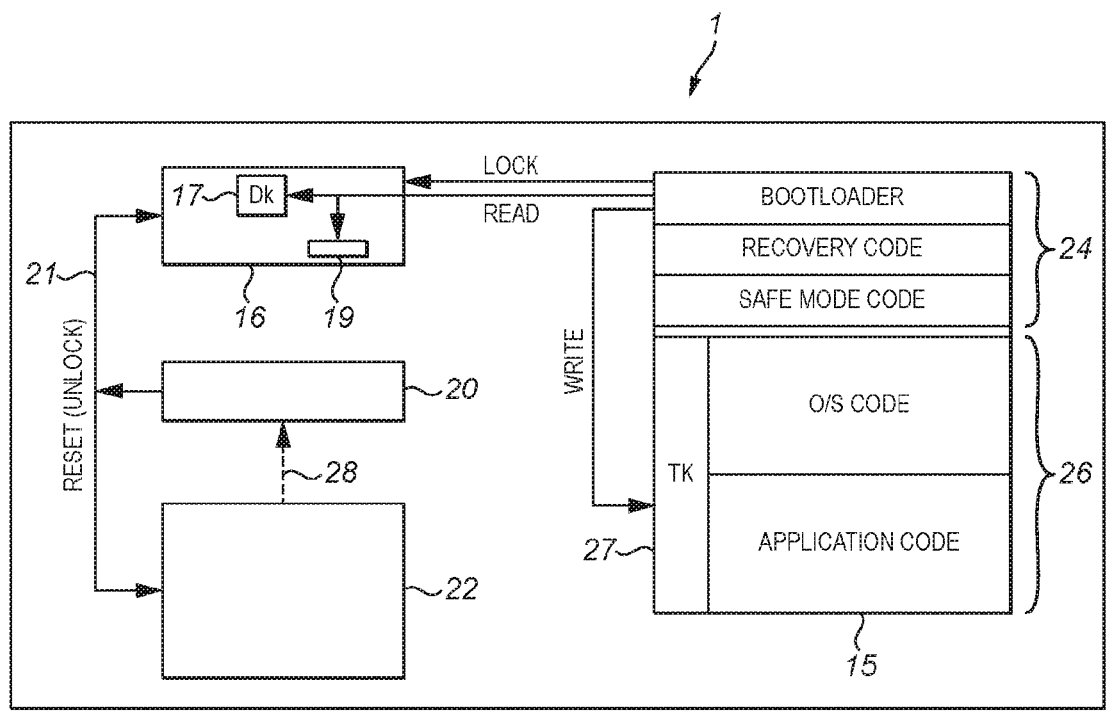
FIG. 2 schematically shows components of the device of FIG. 1 in greater detail according to an embodiment.

FIG. 2 schematically shows components of the computing device 1 in greater detail. Like numbering will be used to describe like features as previously described.

In the present embodiment, the security component 20 is in communication with the secure key store 16 and CPU 22 via security bus 21.

As above, The NV memory store 15 is partitioned to provide a trusted region 24 and an untrusted region 26.

When the computing device 1 is powered on, e.g. following a power event, a reset signal is generated by the security component 20 and sent to both the CPU 22 and to the secure key store 16 via the security bus 21.

The reset signal causes the CPU 22 to begin execution of trusted code, which in the following embodiments is depicted as bootloader code, but may alternatively be other trusted code e.g. safe mode code or recovery code.

While the bootloader is running, the computing device 1 is considered to be operating in a trusted state.

Therefore, it will be appreciated that the reset signal causes the operating state of the computing device 1 to be a trusted operating state.

The reset signal also unlocks the secure key store 16 such that the bootloader can read Dk.

On reading Dk, the bootloader generates further key data, which is derived from Dk. In the embodiments hereinafter described, the further key data derived from Dk has a limited validity period, and so is hereinafter referred to as a "temporary key" (Tk).

The bootloader stores Tk in the untrusted region 26 of the NV memory store 15, for example in an accessible key store 27, such that Tk may be accessible by all trusted and untrusted code (e.g. the safemode, OS and/or application code etc.). In alternative embodiments, Tk may be stored in the volatile (V) memory store 14.

Tk may, for example, be a symmetric key generated, for example by the bootloader, using a suitable algorithm (e.g. Advanced Encryption Standard (AES), Blowfish, Data Encryption Standard (DES), RC5) or an asymmetric key generated, for example by the bootloader, using a suitable algorithm (e.g. RSA, Diffie-Hellman, Digital Signature Standard (DSS), Digital Signature Algorithm (DSA), elliptical curve cryptography (ECC) etc.), while hashing algorithms (e.g. HMAC) such as SHA256, md5, SHA-3, SHA-1 etc. may also be used. However, for some devices such as embedded devices, it may be advantageous, due to the energy, power and storage constraints on such embedded devices, that Tk is a symmetric key.

Tk may be derived from Dk using even further key data still, hereinafter referred to as "temporary key seed value" 19. In the present embodiment, the temporary key seed value 19 is depicted as being stored in the secure key store 16, but may be stored in the NV memory store 15. The temporary key seed value 19 may be generated by a varying seed value generator (e.g. a timer generating UNIX time/date values and/or a counter generator generating counter values).

In alternative embodiments the temporary key seed value 19 may be a nonce received from a further device (not shown in FIG. 2) remote from the computing device 1.

Alternatively, Tk may be the calculated result of a challenge/response exchange between the computing device 1 and further device in communication therewith (as described in greater detail below).

When Tk is generated by the bootloader and stored in the accessible key store 27, the bootloader transmits a "lock" signal to the secure key store 16 to prevent further access thereto, such that all code, both trusted code (e.g. the bootloader) and untrusted code (e.g. the OS), is prohibited from accessing the secure key store 16, and, therefore, prevented from reading Dk.

It will be appreciated that the secure key store 16 may only be unlocked by a component external from the CPU 22 (i.e. the security component 20), and may only be accessed by trusted code when the computing device 1 is operating in a trusted state.

Once accessed and Dk read, the secure key store 16 is locked such that Dk cannot be read again until a power event occurs. Therefore, the bootloader, which reads Dk to derive Tk when the secure key store 16 is unlocked is not capable of unlocking the secure key store 16 once locked.

In embodiments, a further device (not shown in FIG. 2) in communication with the computing device 1 may have Mk stored thereon or may have access to Mk via another computing device or system.

The further device may also have the device key seed value stored thereon or may have access thereto via another computing device or system. Therefore, the further device will be capable of deriving Dk.

Furthermore, when Tk is derived from Dk using a temporary key seed value, the seed value generator used to generate the temporary key seed value 19 on the computing device 1 may be synchronized with a corresponding seed value generator on the further device. Alternatively, the temporary key seed value may be provisioned on the computing device 1 by the further device (e.g. as a nonce).

In any case, the further device has sufficient key data to derive Tk.

Tk may have any suitable validity timeframe before its validity expires. For example Tk may be a single use key, or Tk may have a defined validity period (e.g. seconds, minutes, hours, days, week etc.).

Therefore, a valid Tk may be used by the computing device 1 as part of a cryptographic and/or verification operation when communicating with the further device. If a valid Tk is not available for such communications, then the further device may ignore/discard communications received from the computing device 1.

Therefore, it will be appreciated that a valid Tk may be required for the computing device 1 to successfully communicate with a further device.

For example, Tk may be used by the computing device 1 to sign communications generated thereby, such that the further device can verify the authenticity of such communications.

Tk may, additionally or alternatively, be used by the computing device 1 to encrypt communications transmitted therefrom or decrypt communications received from the further devices or Tk may be used to initiate a secure communications session with the further device (e.g. generate a secure socket layer (SSL)).

Additionally or alternatively, Tk may be used to demonstrate a status of the computing device 1 to the further device e.g. whether it is operating as expected or whether it has been compromised by malware. For example, if Tk has a limited validity, then the further device may calculate when Tk was generated (e.g. from when the most recent temporary key seed value was generated).

The further device may determine that the computing device 1 is unlikely to have been compromised at the point in time when Tk was correctly generated, thereby verifying the status of the computing device for at least the period prior to the generation of Tk.

In some embodiments, the further device may use a risk analysis algorithm to determine the risk of the computing device being compromised in the period post Tk being generated. The risk may increase linearly with time passed since Tk was generated.

Once a certain risk threshold is reached, the further device may determine the risk that the computing device 1 is compromised as being too great and may discard/ignore any communications received from the computing device 1 after that point, or send a signal to the computing device 1 instructing that a more recent Tk is required to communicate therewith.

However, another device receiving communications from the computing device 1 may determine that the risk is acceptable and continue processing communications from the computing device while Tk is valid. Therefore, it will be seen that a valid Tk may be used by a further device to determine a risk that the computing device has been compromised.

A reset signal is required to be generated by the security component 20 to enable the computing device 1 to generate a new, valid, Tk, e.g. on expiration of its validity.

As before, such a reset signal may be generated after a power event occurring on the computing device. However, the security component 20 may also generate the reset signal on receiving a trigger signal 28 from the CPU 22.

The trigger signal 28 may be generated in response to a communication received from the further device (e.g. instructing that a more recent Tk is required to communicate therewith), or in response to a request from code executing on the computing device 1.

Any code executed by the CPU 22 may cause the CPU 22 to generate a trigger signal 28.

For example, if an application requires or requests access to the secure key store 16 to read Dk, it may request to read Dk, at which point the trigger signal 28 will be generated. Alternatively an application may request an updated Tk, at which point the trigger signal 28 will be generated.

As a further example, malicious code running on the computing device 1 may request access to the secure key store 16 to read Dk, at which point the trigger signal 28 will be generated.

As above, the trigger signal 28 causes the security component 20 to generate a reset signal thereby causing the CPU 22 to begin execution of the bootloader code, such that the computing device 1 operates in a trusted state.

As above, the reset signal also unlocks the secure key store 16 such that the bootloader can read Dk and derive a valid Tk.

It will be appreciated that the security component 20 and the secure key store 16 do not impact on the operation of the OS or any applications during runtime. The only impact on the operation of the computing device 1 is when a power event occurs or a trigger signal 28 is generated.

Before a trigger signal 28 is generated, some or all data in RAM, e.g. as generated by applications during runtime, may be stored in the NV memory store 15 (e.g. in the untrusted region 26), such that the data may be available after the reset.

It will appreciated that further key data may also be stored in the accessible key store 27. For example, one or more public cryptographic keys (Puk/Prk) may be stored in the accessible key store 27, whereby any such Puk/Prk may be used in cryptographic operations by applications e.g. to encrypt/decrypt and/or sign/verify communications. Additionally or alternatively one or more symmetric keys may also be stored in the accessible key store 27 for cryptographic operations.

Figure 3:
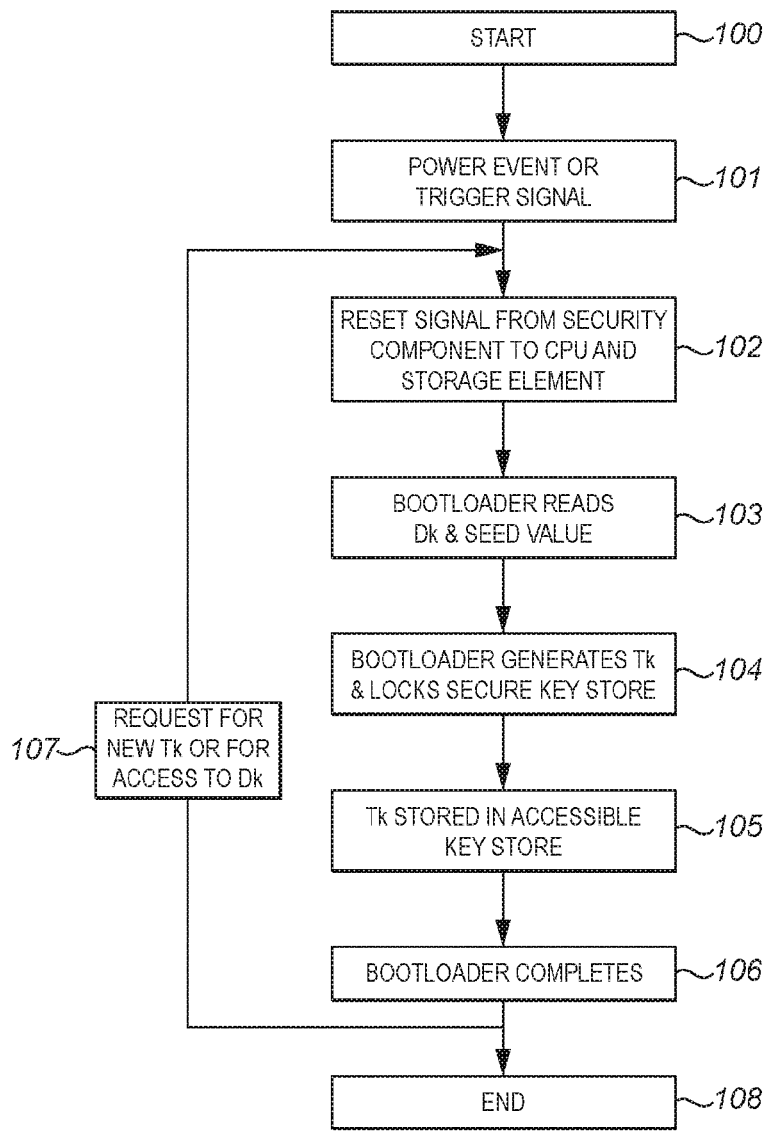
FIG. 3 shows a method of operation of the device of FIG. 2.

FIG. 3 shows a method of operation of the security component according to the embodiment of FIG. 2.

At Step 100 the method starts, and at Step 101 a power event occurs or a trigger signal is generated.

At Step 102, the security component generates a reset signal which is transmitted to the CPU to begin execution of the bootloader code such that the computing device operates in a trusted state. The reset signal is also transmitted to the data store, whereby the reset signal unlocks the secure key store such that Dk stored therein is accessible by the bootloader.

The secure key store may also store further key data such as a temporary key seed value. It will be appreciated that the temporary key seed value may not be stored in the secure key store, but may be at a different memory location accessible by the bootloader.

At Step 103 the bootloader reads Dk and the temporary key seed value and at Step 104 the bootloader generates Tk using a suitable algorithm and generates a signal to lock the secure key store.

At Step 105, the bootloader stores Tk in the NV memory store such that it is accessible by trusted and untrusted code. It will be appreciated the bootloader may first store Tk before generating the signal to lock the secure key store.

At Step 106 the bootloader completes and hands control to trusted or untrusted code depending on the instructions of the bootloader code.

At step 107, a request may be made e.g. by an application to access the secure key store, or for a new or updated Tk, thereby causing the CPU to generate a trigger signal, and the method moves to Step 102.

At Step 108 the method ends.

Figure 4A:
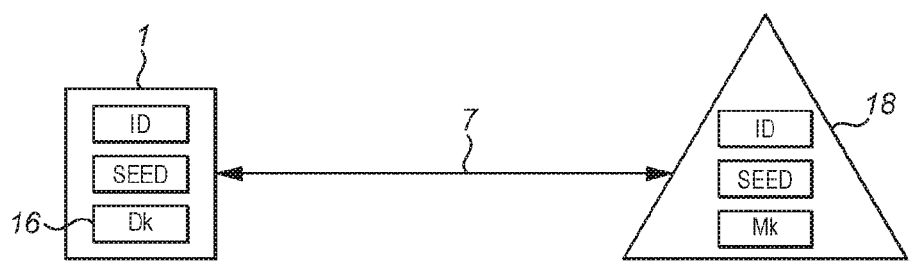
FIG. 4a schematically shows the device of FIG. 1 in communication with a further device.

FIG. 4a schematically shows the computing device 1 in communication with further device 18 via wireless or wired communications. In the present example, wireless communication 7 is used. As above, the further device 18 may be any suitable device having data processing capabilities.

Figure 4B:
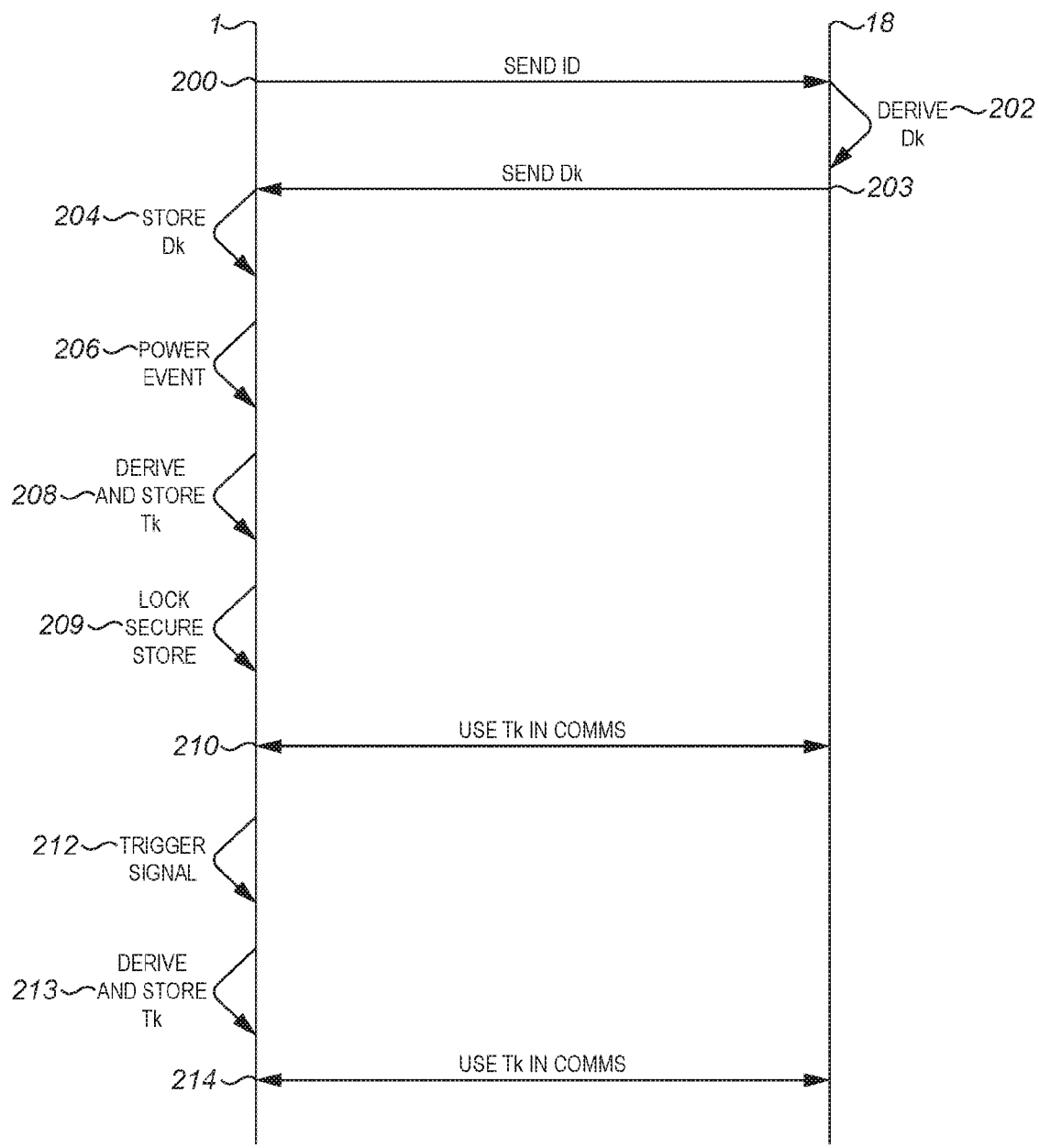

FIG. 4b schematically shows example communications between the computing device 1 and further device 18, whereby a cryptographic and/or verification operation using Tk is undertaken by the computing device 1 on communications transmitted therefrom to the further device 18 and/or on communications received thereby from the further device 18.

Like numbering will be used to describe like features above.

At 200, device key seed data (e.g. a device identifier) which is preferably unique to the computing device 1 is provisioned on/sent to the further device 18 e.g. during a pairing operation between the computing device 1 and the further device 18. In alternative embodiments, the device key seed data may be provisioned on/sent to the further device 18 by another device (e.g. server/registry) e.g. associated with a manufacturer of the computing device 1.

At 202, the further device 18 derives Dk from Mk using the device key seed data and at 203 Dk is provisioned on the computing device 1 whereby, at 204 Dk is stored in the secure key store thereon. It will be appreciated that provisioning Dk on the computing device 1 and storing Dk in the secure key store 16 may be undertaken as part of a pairing operation between the computing device 1 and further device 18.

It will also be appreciated that in some cases the further device 18 may undertake the derivation of Dk itself, or may request that Dk is generated by another device (e.g. a registry service).

As above, at 206 on occurrence of a power event (e.g. a hard or soft reset) or following a trigger signal, the security component generates a reset signal such that the computing device 1 operates in a trusted state and such that the secure key store is unlocked whereby trusted code (e.g. the bootloader) can read Dk.

At 208, the trusted code derives Tk, which is then stored in the NV memory store on the computing device 1 such that it is accessible by applications/code on the computing device 1, and at 209 the trusted code locks the secure key store.

At 210, Tk is used as part of a cryptographic and/or verification operation with the further device 18, whereby any communications transmitted from the computing device 1 may be encrypted or signed with Tk, whereby the further computing device 18 may decrypt or verify such communications while Tk is valid.

If a valid Tk is not used, then the further device may ignore/discard communications received from the computing device 1. Therefore, it will be appreciated that a valid Tk is required to communicate with the further device 18.

As above, at 212 a trigger signal may be generated by code requesting an updated Tk, whereby at 213 the security component computing device 1 alternates from an untrusted state to a trusted state whereby the secure key store is unlocked, such that trusted code can read Dk and derive an updated Tk, and at 214 the trusted code locks the secure key store.

At 214, the updated Tk is used in communications, for example, as part of a cryptographic and/or verification operation with the further device 18 while the updated Tk is valid.

As the valid Tk is generated by trusted code when the computing device is operating in a trusted state, the further device may, by decrypting/verifying communications encrypted/signed with a valid Tk, derive a level of trust that the computing device 1 is functioning as expected.

While Tk being derived from Dk using a temporary key seed value, provides trust for communications and may be used to demonstrate a status of the computing device 1 to the further device 18, such trust and demonstration may be also provided by undertaking a challenge-response exchange between the computing device 1 and further device 18, whereby the further device 18 may send a communication comprising a challenge to the computing device 1, such that a certain response (or lack of response) to the challenge may be indicative of the status of the computing device 1, for example as to whether the computing device 1 is compromised. Additionally or alternatively, a response (or lack of response) to the challenge may be indicative as to whether communications received from the computing device 1 can be trusted.

Figure 4C:
FIG. 4c schematically shows the device of FIG. 1 in communication with a further device according to a further embodiment.
Figure 4D:
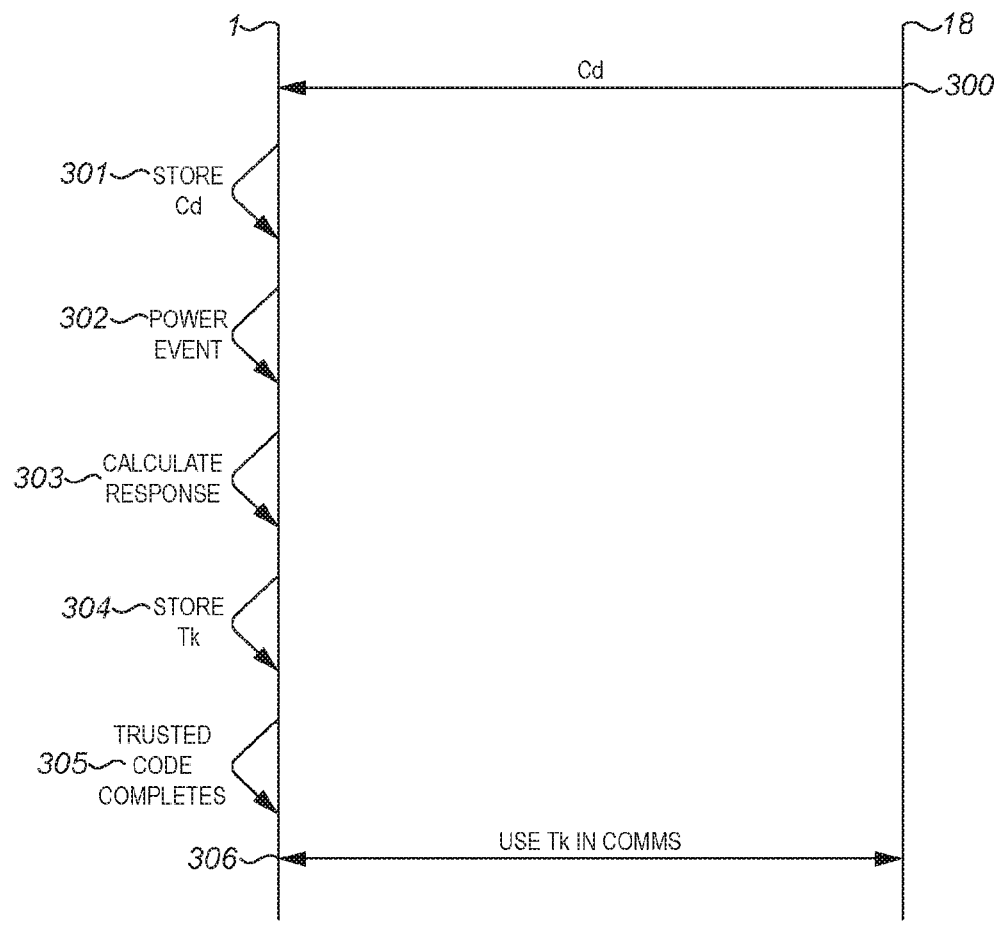
FIG. 4d schematically shows example communications in a challenge response exchange between the device and further device of FIG. 4c.

FIG. 4c schematically shows the computing device 1 in communication with further device 18 via wireless or wired communications according to a further embodiment, while an example of a challenge-response exchange between the computing device 1 and further device 18 is schematically shown in FIG. 4d, whereby at 300, the further computing device 18 transmits challenge data (Cd) to the computing device 1. In the present example, Cd comprises a nonce or other suitable challenge data.

At 301 Cd is transmitted to the computing device 1 and stored thereon, e.g. in NV memory store 15 such that Cd is accessible by trusted code.

At 302, on occurrence of a power event (e.g. a hard or soft reset) or a trigger signal, the computing device 1 operates in a trusted state, and the trusted code (e.g. the bootloader) reads Dk as described above and further reads Cd.

At 303, the trusted code calculates a response to Cd, e.g. by transforming Cd using Dk, and generates response data which may be used as Tk, or from which Tk may be derived. It will be understood that Dk may be provisioned on the computing device as described at 200-204 in FIG. 4b.

Tk may be generated according to instructions relating to the challenge/response exchange provisioned on the computing device 1. Such instructions may be accessible by all code and so may be stored in an untrusted region of the NV memory store.

At 304, Tk is stored in the untrusted region of the NV memory and may be accessible by both trusted and untrusted code.

At 305, the trusted code completes and control may be passed to other code e.g. OS code.

At 306, the OS can use Tk in communications e.g. as part of a cryptographic and/or verification operation with the further device 18, for example, whereby Tk may be used to encrypt or sign communications transmitted from the computing device 1 to the further device 18, and decrypt and verify communications received from the further device 18.

As above, Tk may have a limited validity, and in order to obtain a valid Tk the computing device 1 is reset, or trigger signal generated and an updated Tk may be calculated.

Additionally or alternatively, Cd may have a limited validity. Therefore, if the validity of Cd expires then Tk will also no longer be valid. As such, in order to obtain a valid Tk the computing device 1 requests an updated Cd from the further device 18, and once provisioned thereon, updated response data is calculated which may be used as updated Tk. The provisioning of Cd on the computing device 1 may be undertaken during a pairing operation between the computing device 1 and further device 18.

While Tk may demonstrate a status of the computing device, computing device 1 may include status data in communications transmitted to the further device 18, whereby the status data provides an additional or alternative status update to that demonstrated by Tk. Preferably, the status data may only be generated by trusted code running on the computing device 1.

The status data may relate to, for example, the integrity of the computing device 1, and in particular may relate to the status of software/hardware components on the device (e.g. code, firmware, applications, circuitry), whereby any variation in the status data from the expected status data will be indicative of an anomaly within the software/hardware to which the status data relates. Any anomalies may be as a result of, for example, intrusion activities in which a third party may attempt to modify, change, upload, or 'hack' code/software/firmware.

The status data may comprise, for example, the hash of the operation/firmware/code/hardware, thereby enabling the further device to process the status data and compare the received hash to an expected hash. Furthermore, the status data may be signed by the trusted code using key data.

Additionally or alternatively, the status data may comprise any suitable information e.g. code or n-bit flag values, whereby the flag values may have a specific meaning which will indicate a specific issue to the further device 18, (e.g. a 2-bit flag value having a value of 1 in the status data may indicate that no anomalies in any aspect of the computing device 1 functionality are detected, whereas a flag value of 0 may indicate that an anomaly in one or more operations is detected), whereby the flag values may provide specific information on any aspect of device operation.

Other metrics relating to device functionality may be provided as status data, and therefore further examples of anomalies that may be detected, include, but are not limited to: power consumption patterns, communication density, packet sizes, packet types and main direction of communication (for example if a device starts initiating multiple connections vs. responding to incoming requests), source/type of communication (shift from border router to some unrelated device), statistical sampling of program counter (PC, instruction pointer), type and density of trusted APIs called, invalid signatures detected, tamper detection sensors on housing/board/System on Chip level (light, capacitive, inductive).

Such metrics can be used by the further device 18 to determine the likelihood of the computing device 1 being compromised, and/or may indicate that the computing device requires new firmware to provide certain functionality, whereby the further device 18 may send the necessary firmware. The above metrics are for illustrative purposes only, and any suitable metrics could be used to provide a status update on device functionality to the further device 18.

Furthermore, based on the status data or based on other factors (e.g. after a defined or arbitrary time period has passed, or when Tk was generated), the further device 18 may transmit a communication to the computing device 1, whereby the communication may comprise instructions which, when processed by the computing device 1, cause the computing device 1 to restart or for a trigger signal to be generated such that the computing device 1 operates in a trusted state following the restart or trigger signal.

Alternatively, the further device 18 may transmit a communication comprising instructions, whereby the instructions, when processed by the computing device 1, cause the computing device 1 to boot using the safe mode code, or the recovery code as prescribed by the instructions.

In some examples, as the safe mode code and the recovery code comprise trusted code, they may also access Dk after the power event when the computing device boots using that particular trusted code.

Therefore, when running safe mode code or recovery code, the computing device 1 will be able to generate a valid Tk and undertake cryptographic or verification operations with the further device 18.

While only one further device is described above and depicted in FIGS. 4a-4d, it will be appreciated the computing device 1 may exchange communications and undertake cryptographic or verification operations with two or more further devices.

For example, each of the two or more further devices in communication with the computing device 1 may be capable of deriving or accessing a device key Dk of the computing device 1, and deriving an appropriate Tk.

For example, the computing device 1 may comprise multiple device keys, e.g. a device key per further device in communication therewith. Such device keys may be provisioned on the computing device 1 at manufacture or during a paring operation with the respective further devices.

During a communication exchange with the computing device 1, each of the further devices may provide the computing device 1 with a device key identifier to allow the computing device identify which particular device key should be used to derive an appropriate Tk for further communications with a particular further device.

In embodiments, the security component 20 may have access to a database (e.g. in the NV memory store on the computing device), wherein the database comprises the respective locations in the secure key store 16 at which the different device keys are stored.

Therefore, a trigger signal 28 from the processor may comprise a particular device key identifier, such that the reset signal from the security component 20 may unlock only the location in the secure key store 16 at which the appropriate Dk is stored.

In some embodiments the security component 20 may be configured to store a location identifier relating to the location of the appropriate Dk in the NV memory store on the computing device 1 (e.g. in the accessible key store 27) such that, following a power event, the trusted code may access the location identifier and access the Dk specified by the location identifier, and generate the appropriate Tk.

It will be appreciated, therefore, that device keys in the secure key store 16 for which the computing device has not received a device key identifier and/or for which the security component has not generated a location identifier, will remain inaccessible to the trusted and untrusted code.

Furthermore, while trusted and untrusted code may access and read the location identifiers, unauthorized access to the secure key store 16, and, therefore, to the device keys will be prohibited.

Figure 5:
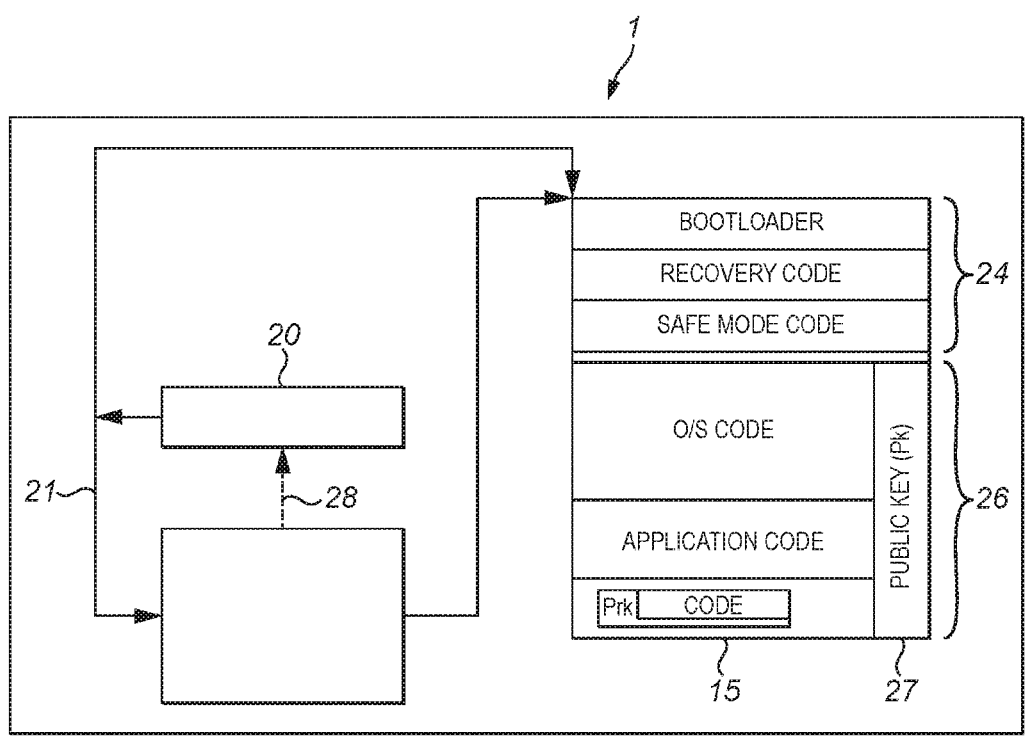
FIG. 5 schematically shows components of the device of FIG. 1 in greater detail according to a further embodiment.

FIG. 5 schematically shows components of the computing device 1 according to a further embodiment. Like numbering will be used to describe like features as previously described.

In the present embodiment, the security component 20 is in communication with the NV memory store 15 via the security bus 21.

As before, following a power event or a trigger signal 28, a reset signal is generated by the security component 20.

The reset signal causes the CPU 22 to begin execution of the trusted bootloader code such that the computing device 1 operates in a trusted state, while in the present embodiment the reset signal also causes the whole, or selected parts, of the NV memory store 15 to change from being read-only to being writeable. Such selected parts may include the whole, or defined portions of the trusted region 24.

In the present example, the bootloader then searches the NV memory store 15 to identify whether a code update is available. Such a code update may comprise, but is not limited to being a firmware update.

If a firmware update is available, and if the firmware update is verified as a valid update e.g. whereby the firmware code is signed using an authorized private key Prk, then the firmware update is used to reflash all or defined portions of the NV memory store 15 as part of a reflash operation. As above, the corresponding key data which is used to verify the signature on the firmware may be accessible in accessible key store 27.

Further checks may also be carried out on the firmware update by the bootloader code to verify its validity before using the update as part of a reflash operation e.g. the firmware update may be determined to be invalid if it is an earlier version of code than the current version of code presently installed.

Once the NV memory store 15 is reflashed, the bootloader code causes the CPU 22 to generate a signal to lock the whole, or the selected parts, of the NV memory store 15, such that those parts are no longer writeable and the boot completes according to the bootloader code, whereby, for example, control may be passed from the bootloader to the OS code.

Therefore it will be appreciated that as the updates are performed by the trusted code, the updates are independent of the untrusted code (e.g. the OS code), and the likelihood of malware infecting the trusted code is low because the trusted code is stored in a trusted region. Furthermore, the firmware updates may provide new functionality for the computing device, and, therefore, it will be seen that such new functionality can be provided in a trusted manner following a power event or a trigger signal.

Therefore, it will also be appreciated that update may be initiated by the further device by sending an instruction to the computing device 1 to generate a trigger signal. Such an instruction may be sent to the computing device, for example, after the further device first sending a firmware update to the computing device 1.

If the firmware update is not verified as valid e.g. whereby an incorrect signature or no signature is present, then the firmware update is not used to reflash selected parts of the NV memory store 15 and the bootloader code causes the CPU 22 to generate a signal to lock the whole, or the selected parts, of the NV memory store 15, such that those parts are no longer writeable and the boot completes according to the bootloader code.

In such a case, the boot loader may generate a nonce and store the nonce in the accessible key store, such that when the OS has control the nonce may be transmitted to the further device 18, such that the further device 18 recognizes the nonce is indicative that the firmware on the device was not authentic, and may transmitted updated code as appropriate.

Figure 6:
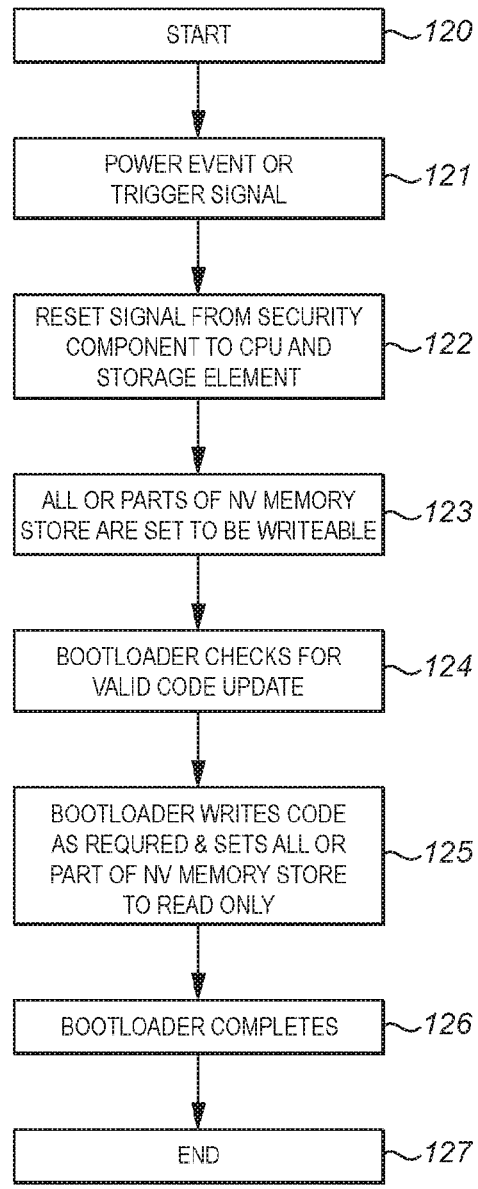
FIG. 6 shows a method of operation of the device of FIG. 5.

FIG. 6 shows a method of operation of the security component according to the embodiment of FIG. 5.

At Step 120 the method starts.

At Step 121 a power event occurs or trigger signal is generated.

At Step 122, the security component generates a reset signal which is transmitted to the CPU to begin execution of the bootloader such that the computing device is in a trusted state.

The reset signal is also transmitted to the data store, whereby at Step 123 the reset signal causes the whole, or selected parts, of the NV memory store of the data store to change from being read-only to being writeable.

At Step 124 the bootloader checks the NV memory store for any valid code updates (e.g. firmware updates). The validity of such updates may be dependent on whether the code updates are signed by a verifiable signature, and/or whether the code updates are newer than the code it will replace.

At Step 125 the bootloader writes the valid code to the NV memory store, e.g. if the code update comprises firmware, then the appropriate portion of the NV memory store is reflashed with the firmware. The bootloader also causes the whole, or the selected parts, of the NV memory store of the data store to change from being writeable to being read-only when the reflash is complete.

At Step 126 the bootloader completes and hands control to trusted or untrusted code depending on the instructions of the bootloader code.

At Step 127 the method ends.

It will be appreciated that the functionality provided by the security component as described above may be obtained using dedicated components, logic, circuitry and/or software on a single computing device.

Alternatively, the functionality provided by the security component 20 may be obtained using dedicated components, logic, circuitry and/or software on one or more discrete computing devices.

FIG. 7a schematically shows an example implementation of security component 20 on the computing device 1 according to an embodiment; while FIG. 7b schematically shows an example implementation of security component 20 on a device separate from the computing device 1.

The example implementation may be provided as part of a silicon on chip device, whereby all components including the security component 20 are provided on a single computing device 1.

In an alternative embodiment, as depicted in FIG. 7b, a discrete computing device 1' (hereinafter referred to as "security device") may comprise a microprocessor, microcontroller, application specific integrated circuit (ASIC) or field programmable gate array (FPGA) arranged in communication with the computing device 1 via a communication channel 32. Such communication between the computing device 1 and security device 1' is preferably hard-wired communication via an input port (not shown) on the computing device 1, such as a USB port or serial port.

As depicted in the schematic example of FIG. 7b, the security device 1' comprises secure key store 16 and security component 20, which are made accessible to the computing device 1 via the communication channel 32.

The secure key store 16 on the security device 1' may take any suitable form, and may comprise, for example, EEPROM, flash memory or a battery backed SRAM.

By providing a security device 1' separate from the computing device 1, security can be provided to existing computing devices 1 without any additional hardware being incorporated therein other than via the input port. Therefore, computing devices may be retrospectively provided with security functionality using a discrete security device.

FIG. 7c schematically shows an example implementation of a security device 1' in communication with computing device 1 according to an embodiment.

In the schematic example of FIG. 7c, the security component 20 of the security device 1' comprises a microcontroller (e.g. a power management unit (PMU)), which in turn comprises a timer component 30, hereinafter referred to as "watchdog", provided as part thereof. The watchdog 30 may be implemented as hardware and/or software.

The watchdog 30 may be configured to, on timeout of a timeout counter 34 associated therewith, force the computing device 1 to perform a system reset by generating and sending a reset signal to the processing element thereon as previously described, whereby timeout may be set to any suitable time value e.g. minutes, hours, days etc., or wherein the timeout may occur at random periods.

In some embodiments, the watchdog 30 may be configured to transmit a pre-timeout signal to the computing device 1 a period before the timeout (e.g. seconds, minutes, hours, as appropriate), whereby the pre-timeout signal may be recognized (e.g. by code running on the computing device 1) as an instruction that a power event is imminent, and appropriate action should be taken to avoid data loss.

In alternative examples, the computing device 1 may, via code executing thereon, periodically access the watchdog to determine the time until next timeout. When the determined time is below a threshold period, the code may generate a pre-timeout signal to cause the computing device 1 to take appropriate action.

The appropriate action on receiving the pre-timeout signal may, for example, be for the computing device to store data or other information in the NV memory store thereon such that the stored data or information is available thereto after the subsequent power event.

In alternative examples, the security device 1' may comprise the watchdog 30 but not the security component 20, which may be provided on the computing device 1. In such a configuration, the watchdog 30 may be configured to generate a trigger signal as described above, which is transmitted to the computing device 1 and subsequently transmitted to the security component 20.

In such a configuration, the security device 1' may generate the pre-timeout signal in advance of the trigger signal, or the computing device 1 may communicate with the security device 1' to allow code executing thereon to determine when the next timeout will occur and generate a pre-timeout signal as required.

The timeout counter 34 may only be programmable by an authorized user or by authorized code e.g. via a secure application program interface (API) on the security device 1', and, therefore, malicious code on the computing device 1 cannot adjust or reset the timeout counter 34.

Therefore, the malicious code cannot prevent timeout of the watchdog 30, and, as such, cannot prevent the reset signal being sent to the computing device 1.

As above, the security device 1' may comprise the secure key store 16 thereon, while the computing device 1 has processing element 2 comprising a CPU 22 and may further comprise a data store 10 having V memory store(s) 14 and NV memory store(s) 15 as previously described.

As will be appreciated by one skilled in the art, while the computing devices described above comprise limited security features, the functionalities provided by the techniques described above may be provided on devices having security functionalities such as MMUs, MPUs and multiple level privileges.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC or FPGA, or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a device wherein a processing element thereof is configured to execute trusted code in response to a first signal which is generated in response to a power event or a trigger signal. By generating a signal and transmitting to the processing element and the data store, the operating state of the device can change, and the executing code can perform verifiable actions while the device is in the operating state.

For example, a secure key store in the data store can be unlocked such that the trusted code can generate a temporary key which can be used in communications with a remote device. If that temporary key is not valid then communications between the device and the remote device may fail. As the first signal causes trusted code to execute and generate the temporary key, the remote device can have confidence that the temporary key was not generated by malicious code, and can, therefore, when the temporary key is used correctly in communications, the remote device can have confidence that the device is not compromised.

Additionally or alternatively, a portion of the data store can be unlocked such that that portion can be written to using valid code updates. Therefore, such functionality provides for updating the devices functionality after a reset in a trusted manner, whereby the trusted code performs the update after first verifying its validity. Such updates are independent of the untrusted code.

In embodiments the data store comprises a secure key store configured to store first key data, wherein the first key data may be accessible to the trusted code when the data store receives the first signal, and wherein the trusted code may be configured to generate second key data on accessing the first key data, and wherein the second key data may be derived from the first key data.

The trusted code may be configured to store the second key data in an accessible key store, wherein the accessible key store may be accessible by trusted or untrusted code, and wherein the trusted code may be configured to, on accessing the first key data, generate and transmit a second signal to the data store, thereby causing the first key data to be inaccessible to the trusted or untrusted code.

The device may be configured to use the second key data in a cryptographic or verification operation with a further device, wherein the second key data may demonstrate a status of the device to the further device.

The first key data may comprise a cryptographic key, wherein the first key data may be derived from master key data which may be inaccessible to the device.

The second key data may be derived from the first key, and may have a limited validity.

Alternatively, the first key data may challenge data received from the further device, wherein the second key data comprises response data corresponding to the challenge data.

Furthermore, the first signal may be configured to cause a whole or a selected part of the trusted region to be accessible to the trusted code, wherein the trusted code may be configured to reflash the accessible whole or selected part of the trusted region with a valid code update stored in the untrusted region.

Furthermore still, the trusted code may be configured to cause the processing element to generate and transmit a third signal to the data store, thereby causing the whole or the selected of the trusted region to be inaccessible to the trusted to untrusted code.

The trigger signal may be generated by the processing element.

In embodiments the device may be communicable with a security device is configured to receive the trigger signal therefrom when in communication therewith.

The trigger signal may be generated in response to a request by untrusted code for access to the secure key store or to the trusted region and/or the trigger signal may be generated in response to a request by trusted or untrusted code for updated second key data.

The device may be configured to generate status data, whereby the status data demonstrates a status of the device to the further device.

The trusted code may comprise one of bootloader code, safe mode code and recovery code.

In embodiments, transmitting the first signal to the data store may cause a secure key store associated with the data store to be accessible by the trusted code.

Techniques are also described for providing a method of operating a device in a trusted state.

The method may comprise: accessing, by the trusted code, first key data from the secure key store; generating, by the trusted code, second key data, wherein the second key data may be derived from the first key data; storing, by the trusted code, the second key data in an accessible key store; generating, by the trusted code, a second signal; transmitting the second signal to the data store, thereby causing the first key data to be inaccessible to the trusted and to untrusted code; performing, a cryptographic or verification operation on one or more communications using the second key data; transmitting, the one or more communications to a further device.

Transmitting the first signal to the processing data store may cause a whole or a selected part of a trusted region of the data store to be accessible to the trusted code.

The method may further comprise: accessing, by the trusted code, a code update in an untrusted region of the data store; determining, by the trusted code, a validity status of the code update; writing, by the trusted code, the code update to the whole or the selected part of the trusted region based on a determination that the code update is valid.

The method may further comprise: generating, by the trusted code, a third signal; transmitting, by the trusted code to the data store, the third signal, thereby causing the whole or the selected part of the trusted region to be non-writable.

The method may further comprise: receiving, at the security component from the processing element, the trigger signal; receiving, at the security component from the security device in communication with the device, the third signal.

Techniques are also described for providing a security device comprising a security component thereon, wherein the security component may comprise a watchdog.

The invention claimed is:

1. A device comprising:
    a processing element;
    a data store, coupled to the processing element, the data store comprising a non-volatile data store having a trusted region for trusted code and an untrusted region for untrusted code, the data store further comprising a secure first key store to store first key data;
    a security component, coupled to the processing element and the data store, wherein the security component is configured to, in response to one of: a power event occurring at the device and receiving a trigger signal, send a first signal to the processing element and the data store,
    wherein the first key store is configured to unlock in response to the first signal,
    wherein the processing element is, in response to the first signal, configured to execute trusted code to:
        access the first key data at the unlocked first key store to derive second key data therefrom,
        store the second key data in a second key store accessible to the trusted or untrusted code, and
        transmit a second signal to the first key store to lock the first key store after accessing the first key data.

2. The device according to claim 1, wherein the device is configured to use the second key data in a cryptographic or verification operation with a further device.

3. The device according to claim 1, wherein the device is configured to use the second key data to demonstrate a status of the device to the further device.

4. The device according to claim 1, wherein the first key data comprises a cryptographic key.

5. The device according to claim 4, wherein the first key data is derived from master key data which is inaccessible to the device.

6. The device according to claim 1, wherein the device is configured to generate a response to challenge data received from the further device.

7. The device according to claim 6, wherein the second key data comprises or is derived from the response or the challenge data.

8. The device according to claim 1 wherein the second key data has a limited validity.

9. A method of operating a device in a trusted state, the device comprising a processing element coupled to a data store having a first key store, and wherein a security component is coupled to the processing element and the data store, the method comprising:
    transmitting, from the security component to the processing element and the data store, a first signal in response to one of a power event at the device and receiving a trigger signal;
    unlocking, in response to the first signal, the first key store;
    executing, at the processing element, trusted code in response to the first signal;
    accessing, with the trusted code, the first key data;
    deriving, from the first key data, second key data;
    storing, using the trusted code, the second key data in a second key store at the data store, wherein the second key store is accessible to trusted or untrusted code; and
    locking, with the trusted code after accessing the first key data, the first key store.

10. A first device comprising a secure data store having a secure first key store to store first key data, a security component and communication circuitry arranged to communicate with a second device, wherein the security component is configured to transmit a first signal to a processing element on the second device and to the secure data store in response to one of a power event on the second device and receiving a trigger signal from the second device, wherein the first key store is configured to unlock in response to the first signal, and wherein the processing element is, in response to the first signal, configured to execute trusted code to: access the first key data at the unlocked first key store to derive second key data therefrom, store the second key data in a second key store, on the second device, accessible to the trusted or untrusted code; and transmit a second signal to the first key store to lock the first key store after accessing the first key data.

11. The first device according to claim 10, wherein the security component comprises a timer component.

12. The first device according to claim 11, wherein the first device is further configured to transmit the first signal in response to timeout of the timer component.

13. The first device according to claim 12, wherein the timer component is configured to timeout after one of a random and defined timeout period.

14. The first device according to claim 10, wherein the first device is further configured to transmit a pre-timeout signal to the second device in advance of transmitting the first signal.

* * * * *